PHASE CORRECTION SYSTEM OF ELECTRIC SIGNALS

Filed March 29, 1965

INVENTOR

Yasufumi Yunde

BY

Stevens, Davis, Miller & Mosher, ATTORNEYS

INVENTOR
Yasufumi Yunde
BY
Stevens, Davis, Miller & Mosher,
ATTORNEYS

PHASE CORRECTION SYSTEM OF ELECTRIC SIGNALS

Filed March 29, 1965

3 Sheets-Sheet 3

INVENTOR

Yasufumi Yunde

BY

Stevens, Davis, Miller & Mosher, ATTORNEYS

3,342,931
PHASE CORRECTION SYSTEM OF ELECTRIC SIGNALS

Yasufumi Yunde, Fujimi-cho, Iruma-gun, Japan, assignor to Japan Broadcasting Corporation, Tokyo, Japan Filed Mar. 29, 1965, Ser. No. 443,211
Claims priority, application Japan, Apr. 9, 1964, 39/19,807
4 Claims. (Cl. 178—5.4)

ABSTRACT OF THE DISCLOSURE

A system including an electronic resolver connected between an FM demodulator and processing amplifier of a video tape recording device for compensating the phase deviation of a color television signal reproduced therein. The electronic resolver rotates the phase of the subcarrier wave of the color television signal to compensate for time deviation errors in the chrominance subcarrier wave of the reproduced signal.

This invention relates to a phase correction system for electric signals, more particularly to a phase correction system for a carrier chrominance signal in a color television signal reproduced from a recorded medium.

In the known standard system for color television transmission such as is used in Japan and other countries, the subcarrier wave is modulated by a pair of chrominance signals, i.e. a two-phase modulated subcarrier wave is transmitted together with a brightness signal as a background signal, and the transmission is carried out within the same frequency band as that of monochrome television transmission. This system is known in the United States of America as the NTSC Color Television Standard System, as illustrated in the December 1953 issue of the American magazine "Electronics" on pages 138 to 150.

In the above known system, one pair of chrominance signals consisting of subcarrier waves of about 3.58 mc., modulated in amplitude and phase by quadrature modulation, and combined with a color burst signal which is used for color reproduction and consists of the insertion of reference phase subcarrier waves at the position succeeding to the horizontal synchronizing signal for 8–12 cycles, is transmitted together with the brightness signal. On reproducing color images the phase and amplitude of the chrominance subcarrier included in each period of horizontal scanning is demodulated by using the burst signal as a reference signal, and the transmitted image of the objects is reproduced on the screen of a cathode-ray color display tube.

As mentioned above, since the phase and amplitude of the subcarrier wave included in each horizontal scanning period of color television signal, is determined by the corresponding color of the objects using the color burst signal as a reference signal, it is very important for a correct color reproduction that accurate coincidence of the phase and amplitude of the subcarrier wave in the whole color television transmission system be made. The coincidence of the phase of the transmitted signal to that of the original transmitted signal is especially important.

It is known that the wide frequency band signals such as monochrome or color video signals may be magnetically recorded on magnetic video tape, and the recorded signals may be reproduced from the magnetic video tape. For such purposes, an "Ampex" type video tape recorder is known. In such magnetic video tape recording and reproducing devices, a carrier wave suitable for recording on magnetic tape is frequency modulated by the above mentioned color television signals and after the reproduction of the signal by demodulation original color television signals may be obtained.

In such an apparatus it is difficult to drive magnetic tape at a constant tape speed in the recording and reproducing of signals, thus rotating irregularities among the plurality of the rotating heads and also some geometrical errors are unavoidable. Consequently, phase errors in the color subcarrier wave may occur.

Several systems have been proposed for correcting phase errors in the subcarrier induced in such an operation. However, these systems of the prior art all have many disadvantages. For instance in such systems it is difficult to achieve a response time for correcting phase errors within an allowable value, means for stabilizing the servo mechanism system of a video tape recorder is much too complicated, and due to the cost of these systems, their utilization solely for the purposes of color television is rather uneconomical.

The device according to the present invention relates to an electronic resolver providing a phase correction system in which the phase of the subcarrier wave is rotated to compensate for the time deviation errors involved in a chrominance subcarrier wave of a color television signal reproduced by a video tape recorder. The electronic resolver according to the invention is connected between an FM demodulator and a processing amplifier of the video tape recording device.

According to the invention the reproduced color television signal from the FM demodulator is separated by filters into two parts, one of which has the lower band brightness components and the other has the higher band components comprising the carrier chrominance signal. The phase of the latter carrier chrominance signal which passes through the high pass filter is stabilized by the electronic resolver, and thus, the stabilized higher band components which include the carrier chrominance signal and said lower band brightness components are mixed to obtain a color television signal containing no chrominance errors. The combined signals thus obtained are supplied to the processing amplifier in which the signals undergo wave form shaping.

The principal object of the invention is to provide a phase correction system for electronically correcting phase errors of electric signals.

A further object of the invention is to provide a phase correction system for a carrier chrominance signal produced from a magnetic recording and reproducing device, in which the reproduced signal is demodulated line by line, correcting the phase deviation of the carrier chrominance signal to reproduce a correct color television signal.

A further object of the invention is to provide a phase correction system in which the phase deviation of the subcarrier caused by magnetic tape speed, and the wearing out of magnetic heads and changes in dimension of some parts, are corrected electronically with a system having fewer controlling positions, and thus, the system is much easier to control.

For a better understanding of the invention, reference is made to the following description in conjunction with the accompanying drawings, in which, FIG. 1 is a block diagram illustrating the basic principle of a phase correction system according to the invention;

Figures 1, 2:
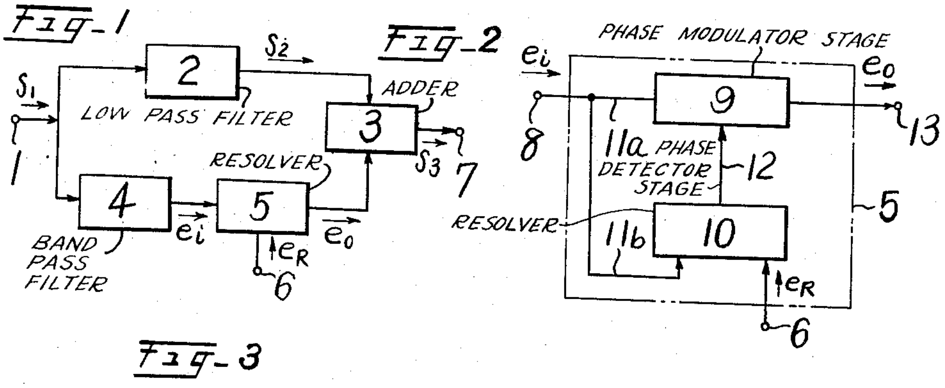
FIG. 2 is a block diagram of an electronic resolver which illustrates the basic principle of phase correction according to the invention.
Figure 5:
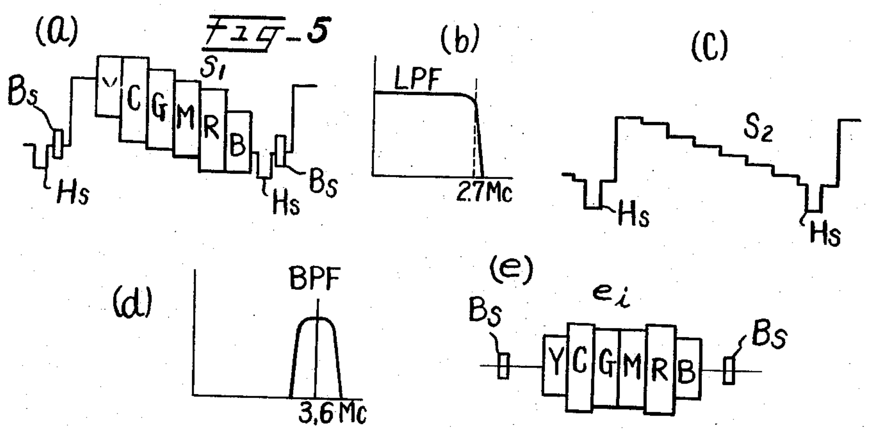
Figure 6:
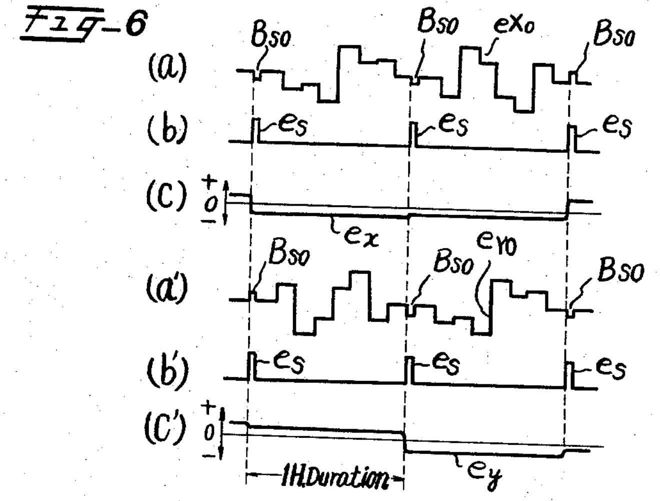
Figure 7:
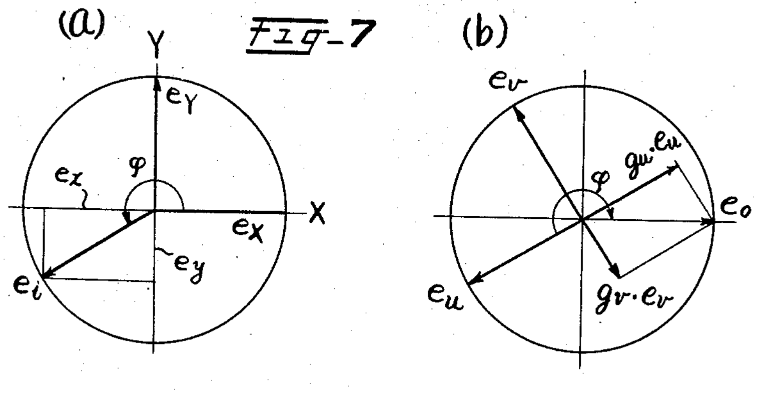
Figure 8:
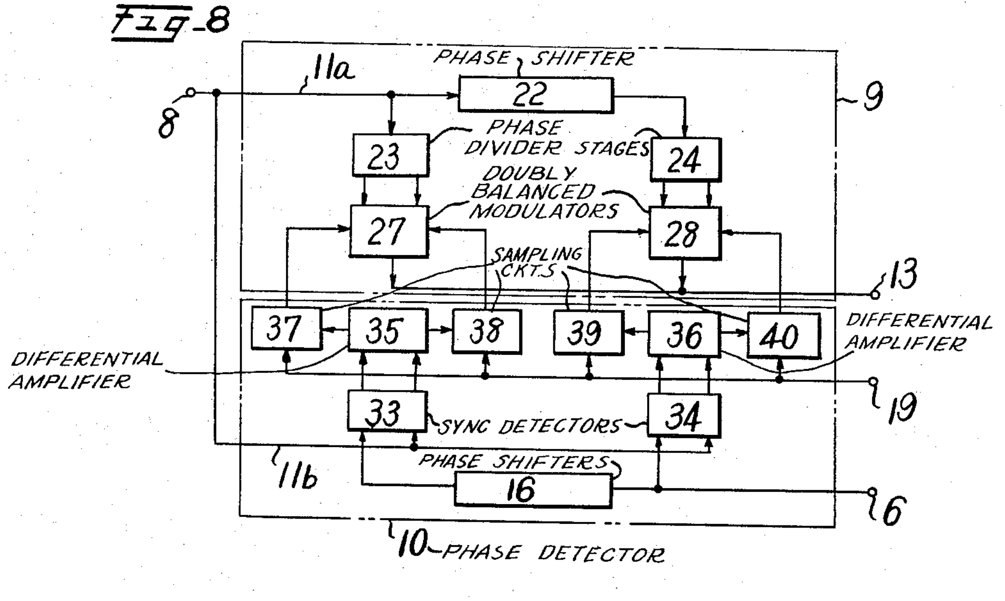
Figure 9:
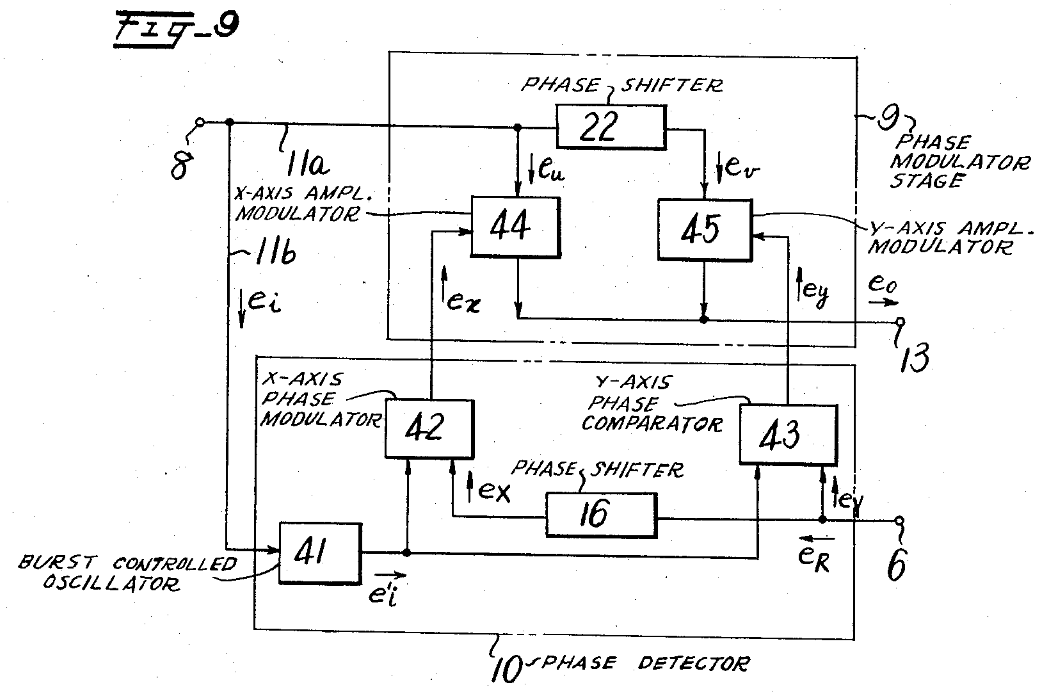

FIGS. 5(*a*), (*b*), (*c*), (*d*), (*e*) and FIGS. 6(*a*), (*b*), (*c*), (*a'*), (*b'*), (*c'*) are wave form diagrams for illustrating the performance of the phase detector of the electronic resolver;

FIGS. 7(*a*), (*b*) illustrate the vector relation between the input and output signals in the electronic resolver according to the invention;

FIG. 8 is a block diagram of another embodiment of the invention using the same principle of the embodiment shown in FIG. 2; and FIG. 9 is a block diagram of a further embodiment of the invention.

The corresponding elements in these drawings are identified by the same reference numbers in order to facilitate an understanding of the invention.

FIG. 1 illustrates diagrammatically a phase correction system according to the present invention applied to a magnetic video tape recording and reproducing circuit.

In this system a color television signal $S_1$ reproduced from magnetic tape and FM demodulated, and including the time base deviation of the carrier chrominance signal is applied to terminal 1. The signal $S_1$ supplied to adder 3 as a lower band luminance component $S_2$ through low pass filter 2 which passes 0–2.7 mc., and through band pass filter 4 which passes 2.7–4.5 mc. and thereby separates the high band component signal $e_i$ including the carrier chrominance signal having a time base deviation, and this signal $e_i$ is led to the subcarrier electronic resolver circuit 5. To the electronic resolver circuit 5, a stable phase reference signal $e_R$ from terminal 6 is also supplied. The signal $e_i$ to the electronic resolver 5 is corrected by said stable phase reference signal $e_R$, resulting in high band component output signal $e_o$ which includes the carrier chrominance signal components, in which the phase of the subcarrier wave has been corrected. The phase corrected high band component $e_o$ and said low band luminance component $S_2$ are combined in adder 3, and routed to a processing amplifier from terminal 7.

FIG. 2 shows a block diagram illustrating the basic principle of the electronic resolver 5 according to the invention. The high band component signal $e_i$ including the carrier chrominance signal which may contain time base deviations is applied to the terminal 8. The electronic resolver circuit 5 consists of a phase modulator stage 9 and a phase detector stage 10. A stable phase reference signal $e_R$ supplied from terminal 6 and said signal $e_i$ including phase deviation of the subcarrier wave are applied to the phase detector stage 10, wherein a phase difference signal $e_{(\phi)}$ is produced by detecting the difference between the phase of color burst signal in the signal $e_i$ and the phase of the stable phase reference signal $e_R$. The phase difference signal $e_{(\phi)}$ is fed to the phase modulator stage 9, through line 12. In the phase modulator stage 9, said signal $e_i$, which is supplied through line 11*a* and contains subcarrier phase deviation is compared with the phase difference signal $e_{(\phi)}$ which is supplied through line 12, and the phase of the carrier chrominance signal in the signal $e_i$ is corrected in accordance with the phase of said reference signal $e_R$ in each horizontal scanning period. Thus, a carrier chrominance signal in which the phase is stabilized in each horizontal scanning period is obtained from terminal 13.

Figure 3:
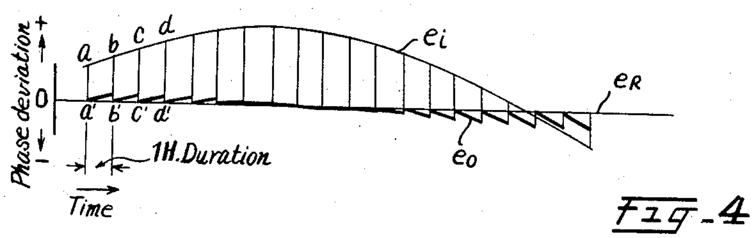
FIG. 3 is a diagram illustrating the phase relation between the input and output signals in the electronic resolver shown in FIG. 2.

FIG. 3 is a diagram showing the phase relation between input and output signals of the electronic resolver explained in FIG. 2. As mentioned above, signal $e_i$ which may include a phase deviation is deviated as the curve $e_i$ as shown in FIG. 3, the phase at the positions of burst signals succeeding to each horizontal synchronizing signal in each horizontal scanning period, i.e. the phase at the points *a*, *b*, *c* and *d* are corrected and drawn toward the phase of the stable phase reference signal $e_R$ which correspond to points *a'*, *b'*, *c'* and *d'*, respectively. As a result, the signal $e_i$, including phase deviation is corrected in phase, and the phase corrected carrier chrominance signal $e_o$ is obtained as an output signal of the resolver. As a phenomenon, such an operation is similar to the restoring of D.C. in the video signal of a television transmitting system, in that the video signal is locked to the reference potential by clamping at a pedestal position in each horizontal scanning period. As mentioned above, since the correction of phase in the electronic resolver circuit is carried out at each horizontal scanning period the phase fluctuation in one horizontal duration may not be corrected. However, as a result of many experiments it is proved that such phase deviation within one horizontal deviation does not have an effect on practical use. The output signal $e_O$ of the resolver as shown in FIG. 3 shows that it contains fluctuations in each horizontal deviation.

Figure 4:
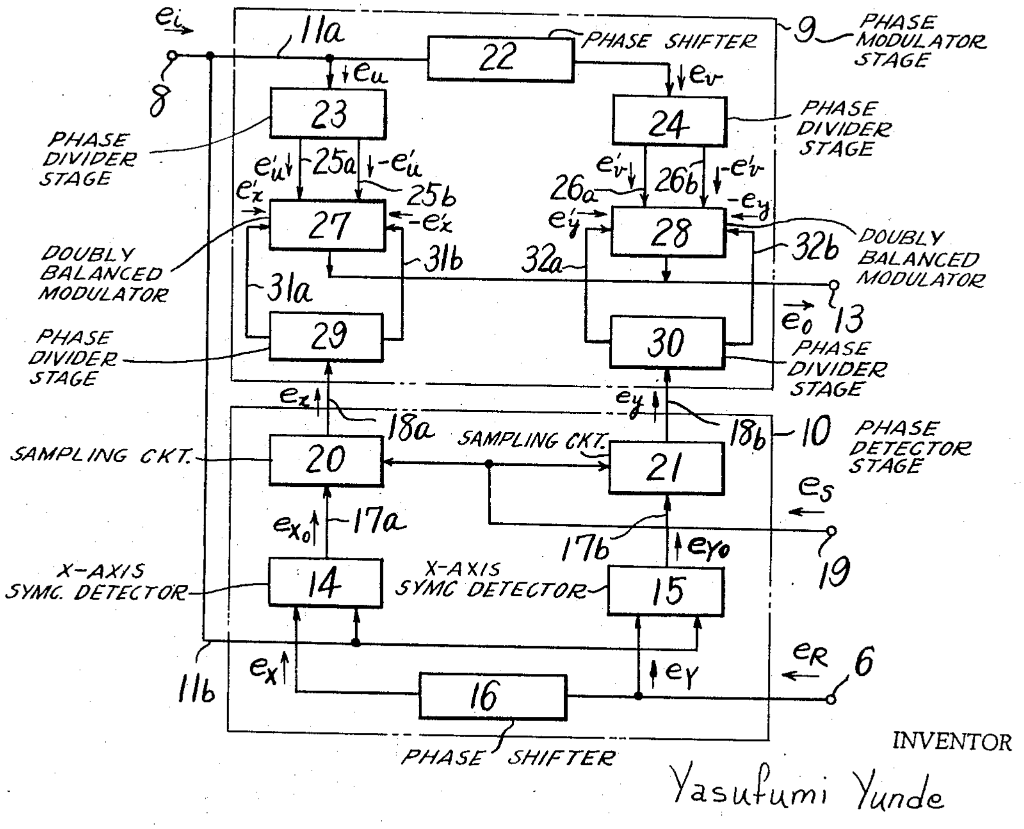
FIG. 4 is a block diagram illustrating an embodiment of the electronic resolver according to the invention.

FIG. 4 illustrates a detailed block diagram of an embodiment of the electronic resolver according to the invention.

FIGS. 5(*a*) to (*e*) and 6(*a*), (*b*), (*c*), (*a'*), (*b'*), (*c'*) are wave form diagrams for explaining the operation of the phase detector in the electronic resolver in FIGS. 1, 2 and 4.

The operation of the embodiment of the invention will now be explained in detail referring to FIGS. 4, 5 and 6.

As described above, the color television signal $S_1$ in FIG. 5(*a*), which may include phase deviation of the carrier chrominance signal (FIG. 5(*a*) illustrates that the color bar signals at the output of color bar television signal generator) consist of two parts, one of which is luminance signal $S_2$ as shown in FIG. 5(*c*) obtained through the low pass filter 2 having characteristics as shown in FIG. 5(*b*), and the other one is carrier chrominance signal $e_i$ as shown in FIG. 5(*e*) including phase deviation, obtained through band pass filter 4 having characteristics as shown in FIG. 5(*d*). The carrier chrominance signal is supplied to terminal 8 in FIG. 4. As FIG. 5(*c*) indicates the wave form is similar to that of the monochrome television signal. The color bar signal $S_1$ in the color television signal includes color burst signal $B_s$, namely the reference phase wave for said carrier chrominance signal, of about 3.58 mc. for color synchronization and carrier chrominance signal $e_i$ as shown in FIG. 5(*e*), which is the modulated product of phase and amplitude of the subcarrier wave of 3.58 mc. corresponding to the color of the objects, and which includes various color components i.e., color components of, Y. C. G. M. R. and B. The carrier chrominance signal $e_i$ including phase deviation as shown in FIG. 5(*e*) is applied to the phase modulator stage 9 through line 11*a*, and is also applied to the phase detector stage 10 through line 11*b*, respectively. The stable phase reference signal $e_R$ is supplied from the terminal 6, and is supplied by Y-axis synchronous detector 15 as $e_Y$ and to X-axis synchronous detector 14 as reference signal $e_x$ which is delayed in phase by 90° from $e_R$ and $e_Y$ through 90° phase shifter 16 comprising delaying elements. Each synchronous detector 14 and 15 consists of a quadrature two-phase synchronous detector, and detects the signals $e_i$ supplied through line 11*b* respectively on each axis of reference subcarrier, namely the stable phase reference signals, $e_x$ and $e_Y$, and synchronous detector output signal $e_{xo}$ and $e_{Yo}$ are obtained at the line 17*a* and line 17*b*, respectively. The said synchronous detectors 14, 15 may be of a known type having the characteristic that the detector output is proportional to sin. $\varphi$, wherein $\varphi$ is the phase difference between $e_x$ and $e_i$ or $e_Y$ and $e_i$. Thus, from signal $e_i$ including phase deviation, the synchronous detector output signal $e_{xo}$ as FIG. 6(*a*) on the line 17*a* and also synchronous detector output signal $e_{Yo}$ as FIG. 6(*a'*) on the line 17*b* are obtained. This indicates that the phase of the above signal $e_i$ is shifted from the phase of the reference subcarrier $e_R$ in each horizontal period. Therefore, it can be understood that since the phase of the chrominance subcarrier wave deviated by an amount corresponding to the detected burst signal output $B_{so}$ as shown in FIGS. 6(*a*) and (*a'*), causes the deviation of the chrominance signal from the original color of the objects, the deviation can be compensated by controlling the carrier chrominance signal in FIG. 5(*e*) by said detected burst signal output $B_{so}$ to compensate the deviations. Each synchronous detector output $e_{xo}$, and $e_{yo}$ of FIGS. 6(*a*) and (*a'*) obtained from the lines 17*a* and 17*b* is applied to the sampling circuits 20 and 21 respectively. By the sample pulse applied to terminal 19, coinciding with the position of the color burst signal as shown in FIGS. 6(*b*) and (*b'*) the potential of the detected burst signal output $B_{so}$ is sampled, and thus X-axis phase difference signal $e_x$ in FIG. 6(*c*) and Y-axis phase difference signal $e_y$ in FIG. 6(*c'*) are obtained at lines 18*a* and 18*b*, by using capacitors for instance, and maintaining the potential during one horizontal scanning period. Between these signals $e_x$ and $e_y$, there is a relation that $$e_x^2+e_y^2=\text{constant}$$

The sample pulses of FIGS. 6(*b*) and (*b'*) may be obtained by differentiating the trailing edge of each horizontal synchronizing signal, and after shaping, delayed to coincide with the position of the burst signal. FIGS. 6(*c*) and (*c'*) indicate that the phase difference signal $e_x$ and $e_y$ which are maintained during each horizontal scanning period have different potentials, owing to the fact that the phase of the burst signal in each horizontal scanning period is deviated, i.e. the phase of the carrier chrominance signal is deviated. From the signal $e_i$ thus applied to terminal 8 a signal $e_u$ through line 11*a* which is in phase with $e_i$ and a signal $e_v$ of which phase is delayed 90° through 90° phase shifter 22 comprising delay element are obtained. The signals $e_u$ and $e_v$ are added to phase divider stages 23 and 24. In these divider stages the signals are divided into two signals respectively, of which pair of signals are in phase of 0° and 180°. In lines 25*a* and 25*b*, $e_u'$ and $-e_u'$ are obtained differing in phase by 180° from each other and also in lines 26*a* and 26*b*, $e_v'$ and $-e_v'$ are obtained which differ in phase by 180° from each other. Therefore, considering $e_u'$ in the line 25*a* as a reference signal, the phase relation among these signals $e_u'$, $\rightarrow e_v'\rightarrow -e_u'\rightarrow -e_v'\rightarrow e_u'$, circulate while keeping a phase angle of 90° between each other, and also keeping the same absolute value namely, the same amplitude. The signals $e_u'$, $-e_u'$ and $e_v'$, $-e_v'$ are supplied to doubly balanced modulators 27, 28 respectively.

As described above, the phase difference signals $e_x$ and $e_y$ obtained in the sampling circuits 20 and 21 are supplied to the phase dividers 29 and 30, and are converted into positive and negative signals at their outputs, $e_x'$ on the line 31*a*, $-e_x'$ on line 31*b*, $e_y'$ on line 32*a* and $-e_y'$ on line 32*b*. Making the above mentioned signals the modulating signals and making the signals $e_u'$, $-e_u'$ and $e_v'$, $-e_v'$ carriers, these signals are supplied together to the doubly balanced modulators 27 and 28. Each modulator 27 and 28 may be a known doubly balanced modulator having the characteristics that the conversion conductance $g_u$ and $g_v$ will change in proportion to the above modulating signals.

The resolver output signal $e_o$ thus obtained from terminal 13 which consists of the output signal of each modulator 27 and 28 and the phase corrected carrier chrominance signal, is a signal which has the same proportion of the absolute value to that of the resolver input signal $e_i$ including phase deviated carrier chrominance signal, and the phase difference of this signal $e_o$ to the reference signal $e_R$ is rotated in the inverse drection to that of $e_i$ to $e_R$.

FIG. 7 illustrates a vector diagram of input and output signals of the electronic resolver. The process of correcting of signal $e_i$ and its conversion to phase stabilized signal $e_o$, will be more clearly understood from the following description of the diagram in FIG. 7. FIG. 7(*a*) illustrates the vector relation between the signals in the phase detector 10, in which X, Y coordinate axes are the reference of synchronous detector axes of the two-phase synchronous detectors 14 and 15.

Assuming the phase of said signal $e_i$, including phase deviations, deviated by $\varphi$ as shown in the diagram, detector outputs $e_x$ and $e_y$ of the respective synchronous detectors 14 and 15 are equal to the projection of $e_i$ on the X-axis and Y-axis by the detector characteristics, as in this case, $e_x2+e_y2$=constant, and the position of $e_i$ is at the position in the diagram, $e_x$ and $e_y$ have both negative values. FIG. 7(*b*) illustrates the vector relation between input and output signals of doubly balanced modulators 27 and 28. Input signals of the doubly balanced modulators are $e_u$ and $e_v$, the phase of $e_u$ is equal to $e_i$ in FIG. 7(*a*) and $e_v$ lags 90° from $e_u$. The conversion conductance $g_u$ and $g_v$ of said doubly balanced modulators 27 and 28, have the characteristic of changing linearly with the variation of modulating signals $e_x$ and $e_y$, and in this example, the polarity of the $e_x$ and $e_y$ being negative, the output signals of each doubly balanced modulator are inverse in phase to $e_u$ and $e_v$, and became $g_y \cdot e_u$ and $g_v \cdot e_v$ each proportional to $e_x$ and $e_y$ respectively as shown in the diagram. The resolver output signal $e_o$ composed of these signals takes a position in-phase on the X-axis in FIG. 7(*a*) and the phase difference $\varphi$ is cancelled, and the relation $|e_o|=k|e_i|$ exists, wherein $k$ is a proportional constant and the position of $e_o$ is maintained to a stable position regardless of the shift of $\varphi$ as shown in FIG. 7(*b*). In the above explanation of vector diagram shown in FIG. 7(*a*), (*b*), the efficiency of a synchronous detector and conversion conductance of doubly balanced modulator in this case, is assumed as unity and drawn as the radius of the vector diagram.

FIG. 8 is a block diagram of another embodiment of the invention, which has a different phase detector stage 10 from that of FIG. 4. In FIG. 8 the outputs of synchronous detectors 33 and 34 are proportioned to obtain phase difference of 180° from each other. Accordingly, each detector output will give the phase difference of 180° from each other as is shown in FIG. 6(*a*) or (*a'*). To improve the accuracy of the resolver, these outputs are arranged by a differential amplifier to equalize their amplitude, and keep the potential value corresponding to the phase deviation of the burst signal in sampling circuits 37, 38, 39 and 40 during one horizontal scanning period, and supply it to doubly balanced modulators 27 and 28 as the manner described above. The other operation of this embodiment is the same as the previous embodiment shown in FIG. 4, except that the phase dividers 29 and 30 are eliminated.

In the above description the phase difference signal is obtained by employing a sampling circuit, however, it may also be obtained by the following method which uses a burst controlled oscillator.

FIG. 9 illustrates another embodiment of the invention employing a burst controlled oscillator in which $e_i$ is the carrier chrominance signal including phase deviation in a color television signal. The signal $e_i$ is supplied to the phase modulator stage 9 and to a burst controlled oscillator 41 included in phase detector stage 10. Carrier chrominance signal $e_i$, supplied through line 11*a* to phase modulator stage 9, is fed to 90° phase shifter 22 and to X-axis amplitude modulator 44, from the 90° phase shifter 22, the 90° shifted carrier chrominance signal is supplied to Y-axis amplitude modulator 45. On the other hand the signal $e_i$ through line 11*b*, becomes subcarrier $e_i'$ through burst controlled oscillator 41 including phase deviation. The signal $e_i'$ is supplied to X-axis phase comparator, namely synchronous detector 42, and to Y-axis phase comparator, namely synchronous detector 43, and phase comparison made to a stable subcarrier, namely the phase reference signal $e_R$ derived from synchronizing signal generator such as a crystal oscillator supplied to the terminal 6. A 90° phase shifter 16 is inserted for shifting the phase of reference subcarrier $e_R$ by 90° and supplying these signals to the comparators 42 and 43 of X-axis and Y-axis. In the X-axis phase comparator 42 and Y-axis phase comparator 43, the subcarrier $e_i'$ having a phase deviation from the burst controlled oscillator 41 and the stable subcarrier $e_R$ are compared in phase. The resulting X-axis phase error signal $e_x$ and the Y-axis phase error signal $e_y$ are supplied to modulators 44 and 45 for the X-axis and the Y-axis respectively. Therefore, the above described carrier chrominance signal $e_i$ having phase deviations is linearly amplitude modulated in the modulators 44 and 45 for X-axis and Y-axis by phase error signal $e_x$ and $e_y$ in the X-axis and Y-axis, and a phase corrected carrier chrominance signal of vector resultant $e_0$ is obtained which is supplied to terminal 13.

In FIG. 9 as the phase dividers 23, 24 and 29, 30 are the same as in FIG. 4 and FIG. 8, these illustrations are omitted.

In the above description of the invention, two-phase right angle axes, is described however, it is clear that for the sake of greater accuracy multiphase axes of more than three phases may be employed.

According to the system of the invention, many industrial advantages are obtained, such as:

(1) As the color process circuit is very simple, the distortion of signal is minimized, resulting in a high quality picture.

(2) The equipment has a minimum number of control parts, which are easily controllable, thus providing better stability.

(3) In view of the need for a relatively small number of parts the equipment may be made compact and more economical.

While the electronic resolver of the present invention as described in the specification is directed to the correction of the phase errors of a carrier chrominance signal in a video tape recorder, it is obvious that it also may be advantageously applied in servo circuits and the like.

What I claim is:

1. A phase correction system suitable for correcting phase deviations induced during the transmission of a phase modulated electric signal including at least several cycles of a reference phase wave of constant amplitude, comprising, a phase detector stage, a phase modulator stage, a stable phase reference signal source, said phase detector stage including at least a first and a second synchronous detector for synchronous detection on two-phase quadrature axes and a first 90° phase shifter, said phase modulator stage including at least a first and a second doubly balanced modulator for amplitude modulation on two-phase quadrature axes and a second 90° phase shifter, means for applying said phase modulated electric signal directly to each of said synchronous detectors, said stable phase reference signal source connected directly to said first synchronous detector and through said first 90° phase shifter to said second synchronous detector for applying a stable reference signal thereto, said synchronous detectors producing a plurality of first error signals on two-phase quadrature axes corresponding to the phase difference between the phase of the reference phase wave included in said phase modulated electric signal and the phase of said stable phase reference signal, means for applying said phase modulated electric signal directly to said first doubly balanced modulator and through said second 90° phase shifter to said second doubly balanced modulator, said second synchronous detector connected to said first doubly balanced modulator for applying said first error signals thereto wherein said phase modulated signal is amplitude modulated, said first synchronous detector connected to said second doubly balanced modulator applying error signals thereto wherein said 90° phase shifted electric signal is amplitude modulated, and means for combining both of said amplitude modulated signals and obtaining resultant outputs therefrom.

2. A phase correction system as defined in claim 1, wherein said phase detector stage includes sampling circuits for applying sampling signals coincident with each position of the reference phase wave included at constant intervals in the phase modulated electric signal, and said phase modulator includes a plurality of phase dividers, said sampling circuits are connected to said synchronous detectors for sampling said first error signals for the corresponding duration of a reference phase wave of constant intervals and providing a pair of second error signals within a predetermined period, one of said phase dividers is connected to said first doubly balanced modulator for shifting said phase modulated electrical signal applied to said first doubly balanced modulator 180°, one of said phase dividers is connected between the sampling circuit of said first synchronous detector and said first doubly balanced modulator obtaining a 180° phase shifted second error signal amplification by said first doubly balanced modulator, a phase divider stage connected between said second 90° phase shifter and said second doubly balanced modulator for shifting the phase modulated electrical signal applied to said second doubly balanced modulator by 180°, and a phase divider connected between said second doubly balanced modulator and said limiting circuit of said first synchronous detector for phas shifting the error signal applied to said second doubly balanced modulator by 180°.

3. A phase correction system as defined in claim 1, wherein said phase detector stage includes a plurality of sampling circuits for applying signals coincident to the position of the reference phase wave included at constant intervals in the phase modulated electrical signal, and a plurality of differential amplifiers, one of said differential amplifiers connected to each of said synchronous detectors, said synchronous detectors providing first error signals having a phase difference of 180° from each other, two of said circuits connected to each of said differential amplifiers for sampling said first error signals for durations corresponding to the constant intervals of a reference phase wave thereby producing a quadruple of second error signals on two-phase quadrature axes, and means for applying said second error signals to said first and second doubly balanced modulators in the phase modulator stage.

4. A phase correction system as defined in claim 1, wherein said phase modulated electrical signal is a carrier chrominance signal induced during the transmission of a composite electric signal of a color television system including a combined wave of a luminance signal representing the brightness of a scanned color image and a carrier chrominance signal representing information of saturation and hue of chromaticity of the scanned color image and a color burst signal, and is a resultant of two amplitude modulated chrominance subcarriers having the same frequency and a phase difference of 180° modulated in amplitude by a plurality of chrominance signals representing the chromaticity of the scanned color image, said color burst signal providing at least several cycles of a reference subcarrier wave for the transmission of synchronizing signals corresponding to each scanning period and for the reproduction of the chromaticity in said color image, and including in combination with said phase detector stage and said phase modulator stage, a low pass filter, a band pass filter connected to said phase detector stage and said phase modulator stage, means for simultaneously applying said composite signal to said low pass filter and said band pass filter, and adding means connected to the output of said low pass filter and the output of said phase detector and phase modulator stages, providing a resultant signal in which the phase of carrier chrominance is corrected in each period of horizontal scanning.

References Cited

UNITED STATES PATENTS

| | | | |
|---|---|---|---|
| 2,835,730 | 5/1958 | McMann et al. | 178—5.4 |
| 3,100,816 | 8/1963 | Coleman et al. | 178—5.4 |
| 3,213,192 | 11/1965 | Jensen | 178—5.4 |

JOHN W. CALDWELL, *Acting Primary Examiner.*

DAVID G. REDINBAUGH, *Examiner.*

J. A. O'BRIEN, *Assistant Examiner.*